(12) United States Patent
Ichikawa et al.

(10) Patent No.: US 11,789,263 B2
(45) Date of Patent: Oct. 17, 2023

(54) DISPLAY DEVICE FOR VEHICLE

(71) Applicant: Yazaki Corporation, Tokyo (JP)

(72) Inventors: Junichi Ichikawa, Shizuoka (JP); Tetsuya Sugiyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 86 days.

(21) Appl. No.: 17/382,881

(22) Filed: Jul. 22, 2021

(65) Prior Publication Data
US 2022/0043259 A1 Feb. 10, 2022

(30) Foreign Application Priority Data

Aug. 5, 2020 (JP) ................. 2020-132806

(51) Int. Cl.
G02B 27/01 (2006.01)
B60K 35/00 (2006.01)
G02F 1/13357 (2006.01)

(52) U.S. Cl.
CPC .......... *G02B 27/0101* (2013.01); *B60K 35/00* (2013.01); *G02F 1/133602* (2013.01); *B60K 2370/152* (2019.05); *B60K 2370/33* (2019.05)

(58) Field of Classification Search
CPC .......... B60K 2370/00–98; B60K 35/00; G02B 27/01–0189; G02B 2027/0105–0198; G02F 1/133602
See application file for complete search history.

(56) References Cited

U.S. PATENT DOCUMENTS

| 2019/0121128 A1* | 4/2019 | Kasahara | ............... B60K 35/00 |
| 2020/0159013 A1 | 5/2020 | Hirata et al. | |
| 2020/0201037 A1 | 6/2020 | Yamamoto et al. | |
| 2021/0103144 A1* | 4/2021 | Kuzuhara | ............... B60K 35/00 |

FOREIGN PATENT DOCUMENTS

JP 2017-181786 A 10/2017

* cited by examiner

*Primary Examiner* — Bao-Luan Q Le
*Assistant Examiner* — Christopher A Lamb, II
(74) *Attorney, Agent, or Firm* — Sughrue Mion, PLLC

(57) ABSTRACT

A display device for a vehicle includes a liquid crystal display device including a display surface for displaying an image; and an optical system including a reflecting surface, and forming an optical path of display light from the display surface toward an eye point of a vehicle. The optical system includes a first reflecting surface placed closest to the display surface in the optical path of the display light, and a magnifying reflecting surface that magnifies and reflects the display light. When viewed from an image horizontal direction, the display surface is inclined toward an optical axis of the display light extending from the display surface toward the first reflecting surface. The optical system is configured so that a width of the optical path of the display light in an image vertical direction is reduced, gradually from the display surface toward the first reflecting surface.

9 Claims, 5 Drawing Sheets

DISPLAY DEVICE FOR VEHICLE

CROSS-REFERENCE TO RELATED APPLICATION(S)

The present application claims priority to and incorporates by reference the entire contents of Japanese Patent Application No. 2020-132806 filed in Japan on Aug. 5, 2020.

BACKGROUND OF THE INVENTION

1. Field of the Invention

The present invention relates to a display device for a vehicle.

2. Description of the Related Art

Conventionally, there is a device that displays a three-dimensional virtual image. Japanese Patent Application Laid-open No. 2017-181786 discloses a head-up display device that displays a virtual image including lines generated using a perspective method. The head-up display device in Japanese Patent Application Laid-open No. 2017-181786 displays a virtual image that emphasizes the fact that the virtual image is gradually inclined in such a manner that the upper portion is further away from the viewpoint of the driver.

To display a three-dimensional virtual image, it is preferable to prevent the contrast of a virtual image from being lowered.

SUMMARY OF THE INVENTION

An object of the present invention is to provide a display device for a vehicle that can display a three-dimensional virtual image while preventing the contrast from being lowered.

In order to achieve the above mentioned object, a display device for a vehicle according to one aspect of the present invention includes a liquid crystal display device that includes a display surface for displaying an image; and an optical system that includes a reflecting surface and that forms an optical path of display light from the display surface toward an eye point of a vehicle, wherein the optical system includes a first reflecting surface placed closest to the display surface in the optical path of the display light, and a magnifying reflecting surface that magnifies and reflects the display light, when viewed from an image horizontal direction, the display surface is inclined toward an optical axis of the display light extending from the display surface toward the first reflecting surface, and the optical system is configured so that a width of the optical path of the display light in an image vertical direction is reduced, gradually from the display surface toward the first reflecting surface.

According to another aspect of the present invention, in the display device for a vehicle, it is preferable that in the optical system, a virtual image of the display light is formed by reflecting the display light by a windshield of the vehicle toward the eye point, and the display surface is inclined toward the optical axis of the display light such that an image of an upper part of the virtual image is formed in front of a lower part of the virtual image in a vehicle longitudinal direction.

According to still another aspect of the present invention, in the display device for a vehicle, it is preferable that the optical path of the display light includes a first boundary line that is a boundary line on a lower end side in the image vertical direction, and an inclination angle of the first boundary line with respect to a perpendicular line of the display surface is smaller than an inclination angle of the optical axis of the display light with respect to the perpendicular line.

According to still another aspect of the present invention, in the display device for a vehicle, it is preferable that the liquid crystal display device includes a backlight unit that emits illumination light from a rear surface side toward the display surface, and the backlight unit is configured so that the illumination light is collected in the image vertical direction, gradually from the backlight unit toward the display surface.

According to still another aspect of the present invention, in the display device for a vehicle, it is preferable that the optical axis of the illumination light extends along the optical axis of the display light extending from the display surface toward the first reflecting surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a display device for a vehicle according to an embodiment of the present invention will be described in detail with reference to the accompanying drawings. However, this invention is not limited to the embodiment. Moreover, components in the following embodiment include components that can be easily assumed by those skilled in the art, and components that are substantially the same as those components.

Embodiment

Figure 1:
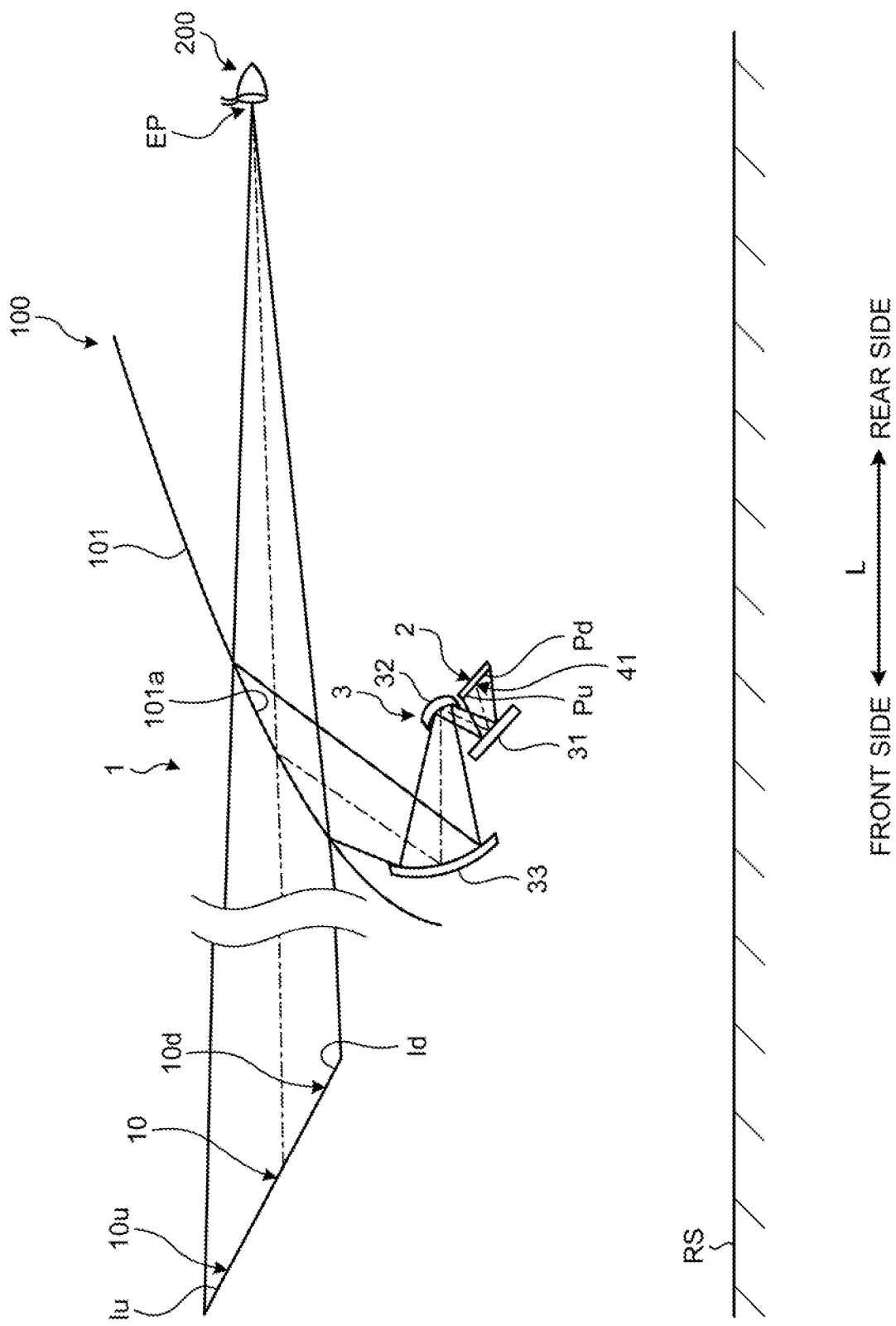
FIG. 1 is a schematic configuration diagram of a display device for a vehicle according to an embodiment.
Figure 2:
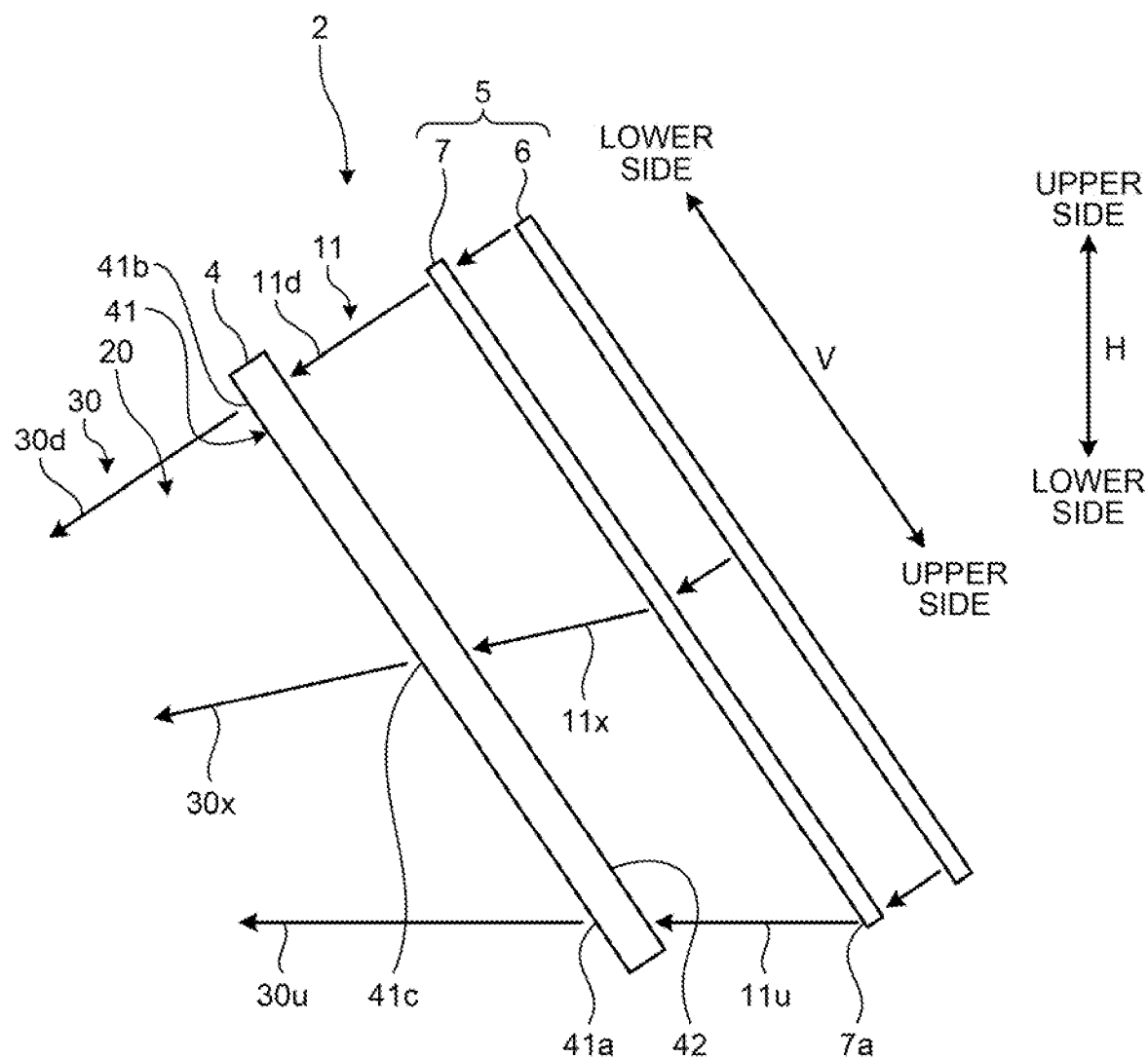
FIG. 2 is a diagram illustrating a backlight according to the embodiment.
Figure 3:
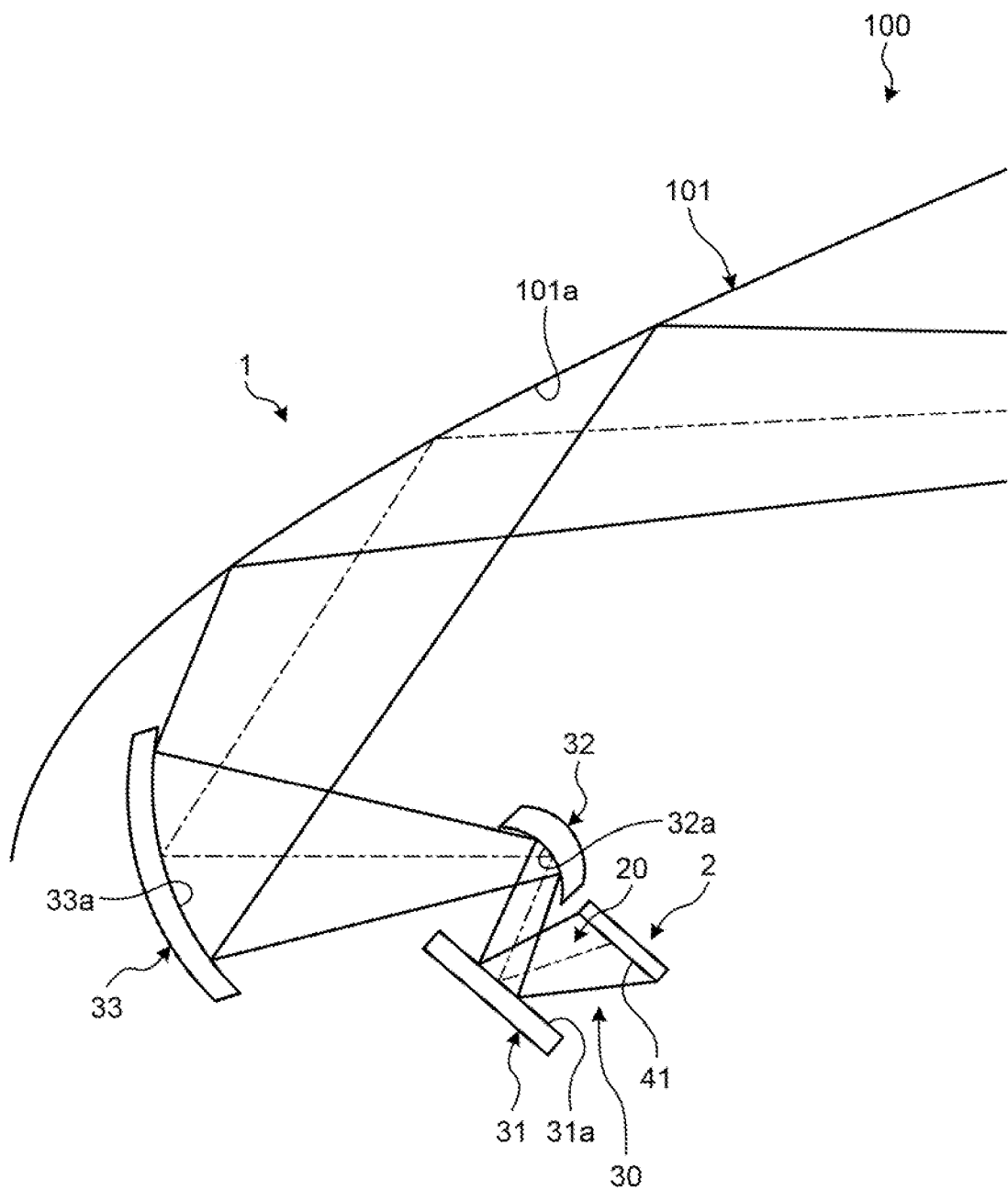
FIG. 3 is a diagram illustrating an optical path of display light according to the embodiment.
Figure 4:
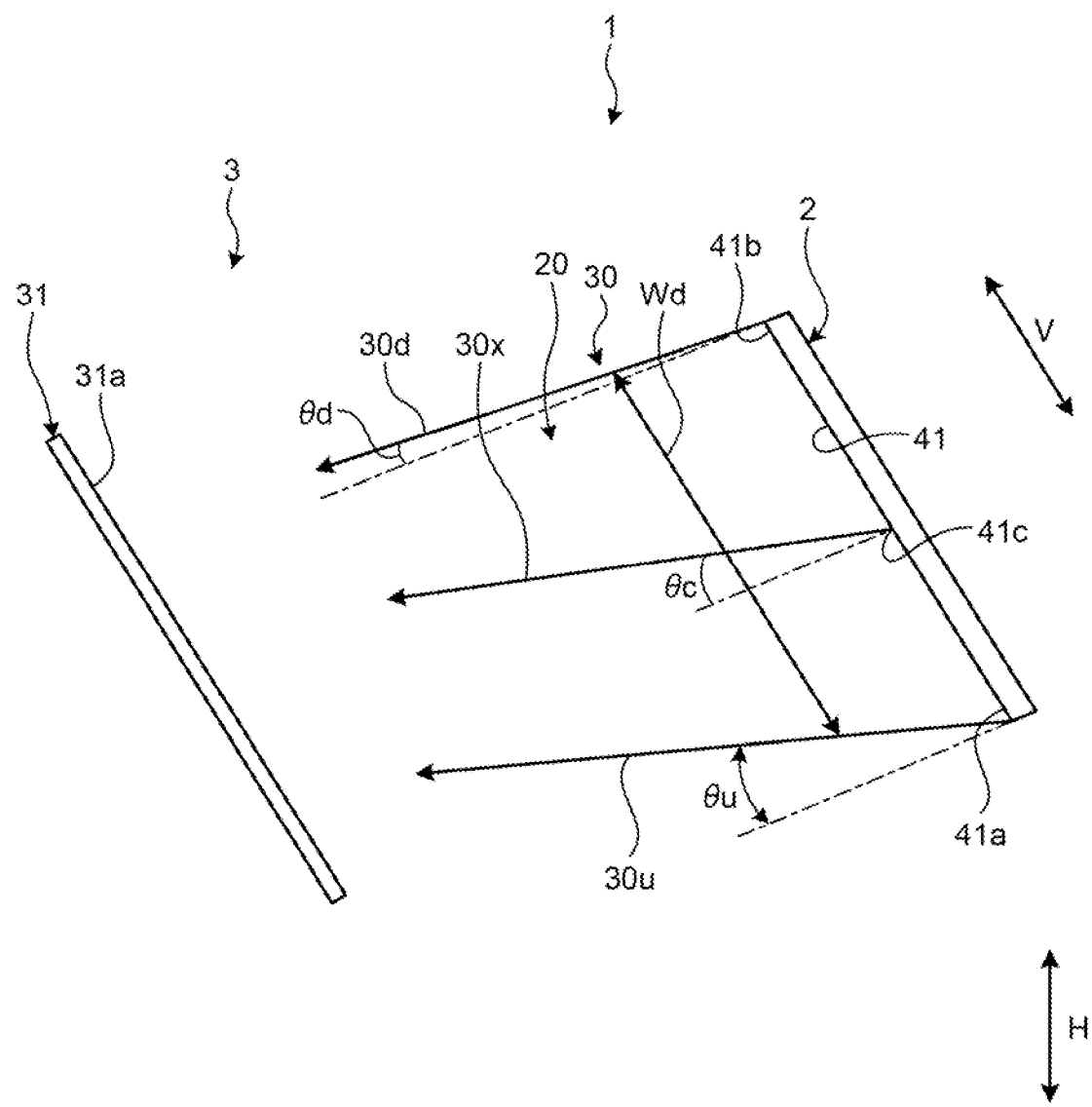
FIG. 4 is a diagram illustrating the optical path of the display light according to the embodiment.
Figure 5:
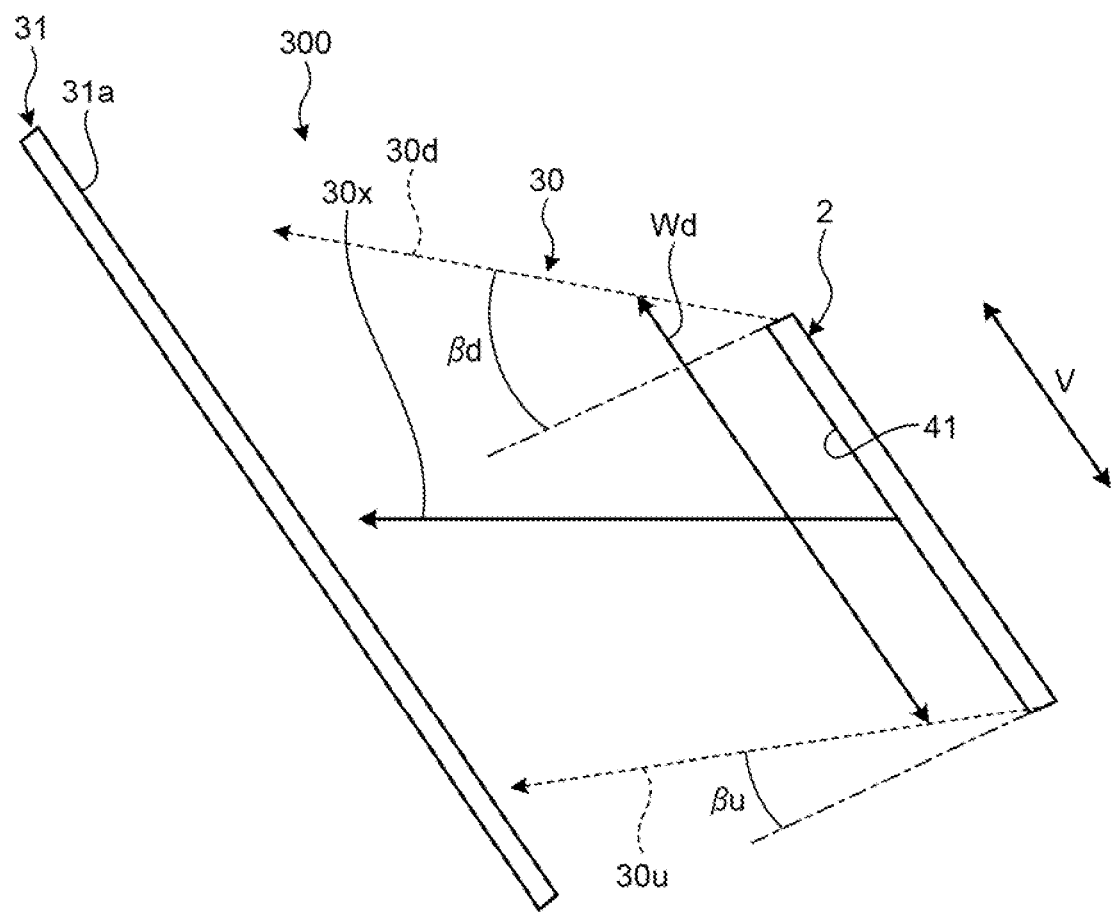
FIG. 5 is a diagram illustrating an optical path of display light according to a comparative example.

With reference to FIG. 1 to FIG. 5, an embodiment will be described. The present embodiment relates to a display device for a vehicle. FIG. 1 is a schematic configuration diagram of a display device for a vehicle according to the embodiment. FIG. 2 is a diagram illustrating a backlight according to the embodiment. FIG. 3 is a diagram illustrating an optical path of display light according to the embodiment. FIG. 4 is a diagram illustrating the optical path of the display light according to the embodiment. FIG. 5 is a diagram illustrating an optical path of display light according to a comparative example.

As illustrated in FIG. 1, a display device 1 for a vehicle according to the embodiment includes a liquid crystal display device 2 and an optical system 3. The display device 1 for a vehicle forms a virtual image 10 by the display light emitted from the liquid crystal display device 2. The display device 1 for a vehicle according to the present embodiment is configured so that the virtual image 10 is displayed by being superimposed on the foreground of a vehicle 100. For example, the virtual image 10 is displayed by being superimposed on the road surface in front of the vehicle 100. For example, the virtual image 10 to be displayed includes route guidance by a navigation device and an object to pay attention to having been detected.

As illustrated in FIG. 2, the liquid crystal display device 2 includes a liquid crystal panel 4 and a backlight unit 5. For example, the liquid crystal panel 4 is a thin film transistor-liquid crystal display (TFT-LCD). However, the liquid crystal panel 4 may also be a liquid crystal panel other than the TFT-LCD. The liquid crystal panel 4 includes a display surface 41 for displaying an image. For example, the shape of the display surface 41 is rectangular. In the liquid crystal panel 4 in the example, a vehicle vertical direction H and an image vertical direction V are opposite to each other. As illustrated in FIG. 1, the optical system 3 is configured so that a pixel Pd placed below the display surface 41 becomes a pixel Iu on the upper part of an image in the virtual image 10. Moreover, the optical system 3 is configured so that a pixel Pu placed above the display surface 41 becomes a pixel Id on the lower part of an image in the virtual image 10.

As illustrated in FIG. 2, the backlight unit 5 is disposed on the rear surface side of the liquid crystal panel 4. The backlight unit 5 faces a rear surface 42 of the liquid crystal panel 4. The rear surface 42 is a surface on the side opposite to the display surface 41. The backlight unit 5 includes a light source 6 and a microlens array 7. For example, the light source 6 includes a plurality of light emitting elements aligned in the image vertical direction V and the image horizontal direction. For example, the light emitting elements are light emitting diodes (LEDs). The light source 6 includes a condenser lens that collects the light emitted from the light emitting elements. For example, the condenser lens collects the light in a direction perpendicular to the microlens array 7. The light emitted from the light source 6 is applied to the liquid crystal panel 4 via the microlens array 7.

The microlens array 7 includes a plurality of minute lenses aligned in the image vertical direction V and the image horizontal direction. The microlens array 7 controls the direction of the illumination light 11 emitted toward the liquid crystal panel 4. As illustrated in FIG. 2, the microlens array 7 of the present embodiment is configured so that the illumination light 11 is collected in the image vertical direction, gradually from the backlight unit 5 toward the liquid crystal panel 4. Arrows of the illumination light 11 in FIG. 2 indicate the directions of optical axes 11d, 11x, and 11u of the illumination light 11 at each of the points. The details of the characteristics of the microlens array 7 will be described below.

As illustrated in FIG. 1 and FIG. 3, the optical system 3 includes a first reflecting member 31, a second reflecting member 32, and a third reflecting member 33. The first reflecting member 31 includes a first reflecting surface 31a that reflects display light 30. Similarly, the second reflecting member 32 includes a second reflecting surface 32a, and the third reflecting member 33 includes a third reflecting surface 33a. The third reflecting surface 33a reflects the display light 30 toward a reflecting surface 101a of a windshield 101. The windshield 101 is disposed in front of a driver 200, and is formed of a transparent glass and the like.

The first reflecting surface 31a in the example has a plane surface. That is, the first reflecting member 31 is a plane mirror. The second reflecting surface 32a and the third reflecting surface 33a each have a free curved surface in a concave shape. The second reflecting surface 32a and the third reflecting surface 33a magnify and reflect the display light 30. The display light 30 of an image displayed on the display surface 41 is reflected by the first reflecting surface 31a, the second reflecting surface 32a, and the third reflecting surface 33a in this order. The display light 30 reflected by the third reflecting surface 33a is reflected toward an eye point EP by the reflecting surface 101a of the windshield 101. The eye point EP is a position estimated as the position of eyes of the driver 200, or the position of eyes of the driver 200 detected by a detection means. For example, the detection means is a camera that picks up an image of the driver 200.

The driver 200 visually recognizes the virtual image 10 by the display light 30 reflected by the reflecting surface 101a. The virtual image 10 is formed in front of the windshield 101 in a vehicle longitudinal direction L. The display device 1 for a vehicle in the present embodiment is configured so that the virtual image 10 is inclined with respect to a road surface RS. As illustrated in FIG. 1, the display device 1 for a vehicle forms an image such that an upper part 10u of the virtual image 10 is in front of a lower part 10d of the virtual image 10 in the vehicle longitudinal direction L. That is, the optical path length of the display light 30 corresponding to the upper part 10u of the virtual image 10 is longer than the optical path length of the display light 30 corresponding to the lower part 10d of the virtual image 10.

As one of means for inclining the virtual image 10, as illustrated in FIG. 4, the display surface 41 is inclined toward an optical axis 30x of the display light 30. The optical axis 30x is an optical axis of the display light 30 extending from the display surface 41 toward the first reflecting surface 31a. The optical axis 30x is a path of light extending toward the eye point EP, among the rays of light emitted from a center 41c of the display surface 41. In other words, the optical axis 30x is an optical axis of the display light 30 visually recognized by the driver 200. When viewed from the image horizontal direction, the display surface 41 is inclined toward the optical axis 30x.

More specifically, the display surface 41 is inclined so that the optical path length of a first passage 30u of the display light 30 becomes longer than the optical path length of a second passage 30d of the display light 30. In this example, the first passage 30u is a passage of light forming the upper part 10u of the virtual image 10. The first passage 30u in the display device 1 for a vehicle in the example is a passage of light from a lower part 41a of the display surface 41 toward the eye point EP. The second passage 30d is a passage of light forming the lower part 10d of the virtual image 10. The second passage 30d in the display device 1 for a vehicle in the example is a passage of light from an upper part 41b of the display surface 41 toward the eye point EP.

The optical system 3 of the present embodiment is configured so that a width Wd of an optical path 20 of the display light 30 in the image vertical direction V is reduced, gradually from the display surface 41 toward the first reflecting surface 31a. In other words, the optical system 3 is configured so that the first passage 30u and the second passage 30d are brought close to each other, gradually from the display surface 41 toward the first reflecting surface 31a. In the optical system 3 in the example, an inclination angle θu of the first passage 30u is greater than an inclination angle θd of the second passage 30d. The inclination angle θu is an inclination angle of the first passage 30$u$ with respect to a perpendicular line of the display surface 41. The inclination angle θd is an inclination angle of the second passage 30$d$ with respect to the perpendicular line described above. Moreover, an inclination angle θc of the optical axis 30$x$ is greater than the inclination angle θd of the second passage 30$d$, and is smaller than the inclination angle θu of the first passage 30$u$. The inclination angle θc is an inclination angle of the optical axis 30$x$ with respect to the perpendicular line described above.

In the display device 1 for a vehicle of the present embodiment, the width Wd of the optical path 20 is reduced from the display surface 41 toward the first reflecting surface 31$a$. Hence, as will be described below, it is possible to prevent the contrast from being lowered. FIG. 5 illustrates an optical system 300 according to a comparative example. The optical system 300 of the comparative example is configured so that the width Wd of the optical path is increased, gradually from the display surface 41 toward the first reflecting surface 31$a$. In this case, when the display surface 41 is inclined toward the optical axis 30$x$ of the display light 30, an inclination angle βd of the second passage 30$d$ is increased. When the inclination angle βd is increased, the contrast of the virtual image 10 tends to be lowered.

Alternatively, the optical system 3 according to the present embodiment can prevent the contrast from being lowered, by making the inclination angle θd of the second passage 30$d$ small. Moreover, the optical system 3 of the present embodiment is configured so that the inclination angle θu of the first passage 30$u$ becomes equal to or less than the maximum angle θt. The maximum angle θt is a threshold determined in view of obtaining the necessary contrast. For example, the maximum angle θt is determined on the basis of the viewing angle of the liquid crystal panel 4.

Furthermore, the backlight unit 5 according to the present embodiment is configured so as to prevent the contrast of the virtual image 10 from being lowered. As described with reference to FIG. 2, the backlight unit 5 collects the illumination light 11 in the image vertical direction V, gradually toward the display surface 41. Thus, the backlight unit 5 can focus the light of the light source 6 toward the optical path 20 of the display light 30. Still furthermore, the microlens array 7 is configured so that the optical axis 11$x$ of the illumination light 11 extends along the optical axis 30$x$ of the display light 30. Thus, the microlens array 7 can efficiently collect the illumination light 11 toward the optical path 20 of the display light 30.

Still furthermore, the microlens array 7 emits light in the direction along the first passage 30$u$, toward the lower part 41$a$ of the display surface 41. More specifically, the optical axis 11$u$ of the light emitted from a lens in a lower part 7$a$ of the microlens array 7 extends along the first passage 30$u$. Thus, it is possible to improve the contrast in the upper part 10$u$ of the virtual image 10.

Still furthermore, the microlens array 7 emits light in the direction along the second passage 30$d$, toward the upper part 41$b$ of the display surface 41. More specifically, the optical axis 11$d$ of the light emitted from a lens in an upper part 7$b$ of the microlens array 7 extends along the second passage 30$d$. Thus, it is possible to improve the contrast in the lower part 10$d$ of the virtual image 10.

As described above, the display device 1 for a vehicle according to the present embodiment includes the liquid crystal display device 2 and the optical system 3. The liquid crystal display device 2 includes the display surface 41 for displaying an image. The optical system 3 includes the reflecting surfaces 31$a$, 32$a$, and 33$a$, and forms the optical path 20 of the display light 30 from the display surface 41 toward the eye point EP of the vehicle 100.

The reflecting surfaces 31$a$, 32$a$, and 33$a$ include the first reflecting surface 31$a$. The first reflecting surface 31$a$ is a reflecting surface placed closest to the display surface 41 in the optical path 20 of the display light 30. The reflecting surfaces 31$a$, 32$a$, and 33$a$ also include a magnifying reflecting surface that magnifies and reflects the display light 30. In the present embodiment, the second reflecting surface 32$a$ and the third reflecting surface 33$a$ are the magnifying reflecting surfaces.

When viewed from the image horizontal direction, the display surface 41 is inclined toward the optical axis 30$x$ of the display light 30 extending from the display surface 41 toward the first reflecting surface 31$a$. The optical system 3 is configured so that the width Wd of the optical path 20 of the display light 30 in the image vertical direction V is reduced, gradually from the display surface 41 toward the first reflecting surface 31$a$. The display device 1 for a vehicle according to the present embodiment can make the display surface 41 inclined toward the optical axis 30$x$ while preventing the contrast of the virtual image 10 from being lowered, and display a three-dimensional virtual image 10.

The optical system 3 of the present embodiment forms a virtual image of the display light 30, by reflecting the display light 30 toward the eye point EP by the windshield 101 of the vehicle 100. The display surface 41 is inclined toward the optical axis 30$x$ of the display light 30 such that an image of the upper part 10$u$ of the virtual image 10 is formed in front of the lower part 10$d$ of the virtual image 10 in the vehicle longitudinal direction L. Consequently, the visibility of the virtual image 10 displayed by being superimposed on the foreground will be improved.

The optical path 20 of the display light 30 obtains a first boundary line that is a boundary line on the lower end side in the image vertical direction V. In the present embodiment, the second passage 30$d$ corresponds to the first boundary line. The inclination angle θd of the second passage 30$d$ with respect to the perpendicular line of the display surface 41 is smaller than the inclination angle θc of the optical axis 30$x$ of the display light 30 with respect to the perpendicular line. By inclining the display surface 41 in this manner, it is possible to make the optical path length of the first passage 30$u$ longer than the optical path length of the second passage 30$d$.

The liquid crystal display device 2 of the present embodiment includes the backlight unit 5 that emits the illumination light 11 from the rear surface side toward the display surface 41. The backlight unit 5 is configured so that the illumination light 11 is collected in the image vertical direction V, gradually from the backlight unit 5 toward the display surface 41. By collecting the illumination light 11 toward the optical path 20 of the display light 30, it is possible to improve the contrast of the virtual image 10.

The optical axis 11$x$ of the backlight unit 5 in the present embodiment extends along the optical axis 30$x$ of the display light 30 extending from the display surface 41 toward the first reflecting surface 31$a$. Thus, the illumination light 11 is effectively collected along the optical axis 30$x$.

Modification of Embodiment

The liquid crystal display device 2 may not include the backlight unit 5. The first reflecting surface 31$a$ is not limited to a plane surface. The first reflecting surface 31$a$ may also be a magnifying reflecting surface such as a free curved surface. The number of the reflecting surface in the optical system 3 is not limited to three. The optical system 3 may include at least one reflecting surface, and at least one magnifying reflecting surface. When the reflecting surface in the optical system 3 is one, the first reflecting surface 31a will be the magnifying reflecting surface. A reflecting member that reflects the display light 30 toward the eye point EP is not limited to the windshield 101, but may also be a combiner, for example.

The contents disclosed in the embodiment and the modification described above may be appropriately combined and executed.

When viewed from the image horizontal direction, the display surface of the display device for a vehicle according to the present embodiment is inclined toward the optical axis of the display light extending from the display surface toward the first reflecting surface. The optical system is configured so that the width of the optical path of the display light in the image vertical direction is reduced, gradually from the display surface toward the first reflecting surface. With the display device for a vehicle according to the present embodiment, it is possible to effectively display a three-dimensional virtual image while preventing the contrast from being lowered.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device for a vehicle, comprising:
   a liquid crystal display device that includes a display surface for displaying an image; and
   an optical system that includes a reflecting surface and that forms an optical path of display light from the display surface toward an eye point of a vehicle, wherein
   the optical system includes a first reflecting surface placed closest to the display surface in the optical path of the display light, and a magnifying reflecting surface that magnifies and reflects the display light,
   when viewed from an image horizontal direction, the display surface is inclined toward an optical axis of the display light extending from the display surface toward the first reflecting surface, and
   the optical system is configured so that a width of the optical path of the display light in an image vertical direction is reduced, gradually from the display surface toward the first reflecting surface.

2. The display device for a vehicle according to claim 1, wherein
   in the optical system, a virtual image of the display light is formed by reflecting the display light by a windshield of the vehicle toward the eye point, and
   the display surface is inclined toward the optical axis of the display light such that an image of an upper part of the virtual image is formed in front of a lower part of the virtual image in a vehicle longitudinal direction.

3. The display device for a vehicle according to claim 2, wherein
   the optical path of the display light includes a first boundary line that is a boundary line of the optical path on a lower end side of the optical path in the image vertical direction, and
   an inclination angle of the first boundary line with respect to a perpendicular line of the display surface is smaller than an inclination angle of the optical axis of the display light with respect to the perpendicular line.

4. The display device for a vehicle according to claim 3, wherein
   the liquid crystal display device includes a backlight unit that emits illumination light from a rear surface side toward the display surface, and
   the backlight unit is configured so that the illumination light is collected in the image vertical direction, gradually from the backlight unit toward the display surface.

5. The display device for a vehicle according to claim 4, wherein
   the optical axis of the illumination light extends along the optical axis of the display light extending from the display surface toward the first reflecting surface.

6. The display device for a vehicle according to claim 2, wherein
   the liquid crystal display device includes a backlight unit that emits illumination light from a rear surface side toward the display surface, and
   the backlight unit is configured so that the illumination light is collected in the image vertical direction, gradually from the backlight unit toward the display surface.

7. The display device for a vehicle according to claim 6, wherein
   the optical axis of the illumination light extends along the optical axis of the display light extending from the display surface toward the first reflecting surface.

8. The display device for a vehicle according to claim 1, wherein
   the liquid crystal display device includes a backlight unit that emits illumination light from a rear surface side toward the display surface, and
   the backlight unit is configured so that the illumination light is collected in the image vertical direction, gradually from the backlight unit toward the display surface.

9. The display device for a vehicle according to claim 8, wherein
   the optical axis of the illumination light extends along the optical axis of the display light extending from the display surface toward the first reflecting surface.

* * * * *